United States Patent
Daniali

(10) Patent No.: US 11,630,700 B2
(45) Date of Patent: Apr. 18, 2023

(54) LOCAL EDGE DEVICE

(71) Applicant: T-Mobile USA, Inc., Bellevue, WA (US)

(72) Inventor: Ali Daniali, Lynnwood, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 200 days.

(21) Appl. No.: 16/827,421

(22) Filed: Mar. 23, 2020

(65) Prior Publication Data

US 2021/0294657 A1  Sep. 23, 2021

(51) Int. Cl.
*G06F 9/50* (2006.01)

(52) U.S. Cl.
CPC .................. *G06F 9/5027* (2013.01)

(58) Field of Classification Search
CPC .... G06F 9/5027; G06F 9/5055; G06F 9/5044; G06F 9/5005; G06F 9/50; G06F 9/5011; G06F 9/5088; G06F 8/60; G06F 8/65; G06F 8/70; G06F 8/71
See application file for complete search history.

(56) References Cited

U.S. PATENT DOCUMENTS

| | | | | |
|---|---|---|---|---|
| 8,688,803 B2 * | 4/2014 | Manion | ............... | H04L 67/1044 707/636 |
| 9,916,233 B1 * | 3/2018 | Qureshi | ............. | G06F 11/3688 |
| 10,044,640 B1 * | 8/2018 | Levine | ................. | H04L 47/827 |
| 10,181,985 B1 * | 1/2019 | Passaglia | ................ | H04L 67/16 |
| 10,216,927 B1 * | 2/2019 | Steinberg | ................ | G06F 21/53 |
| 10,635,437 B1 * | 4/2020 | Kunjuramanpillai | ..... | G06F 8/71 |
| 10,684,837 B2 * | 6/2020 | Kolesnik | ............. | G06F 9/45558 |
| 10,691,504 B2 * | 6/2020 | Liu | ...................... | H04L 41/5025 |
| 11,023,286 B2 * | 6/2021 | Liu | ......................... | G06F 9/455 |
| 11,106,455 B2 * | 8/2021 | Myers | ................. | G06F 9/44505 |
| 11,263,005 B2 * | 3/2022 | Kunjuramanpillai | ..... | G06F 8/63 |
| 11,288,053 B2 * | 3/2022 | Myers | ....................... | G06F 8/60 |
| 11,388,727 B1 * | 7/2022 | Argenti | ................... | H04W 8/24 |
| 2005/0216559 A1 * | 9/2005 | Manion | ..................... | G06F 8/65 709/205 |
| 2008/0130639 A1 * | 6/2008 | Costa-Requena | ....... | H04L 67/51 370/389 |
| 2009/0064127 A1 * | 3/2009 | Schneider | ................. | G06F 8/65 717/170 |
| 2012/0042066 A1 * | 2/2012 | Chatterjee | ........... | H04L 41/0663 709/224 |
| 2015/0106430 A1 * | 4/2015 | y Arcas | ................. | G06F 9/5072 709/203 |
| 2017/0366551 A1 * | 12/2017 | Brandwine | ............. | H04L 47/70 |
| 2018/0074864 A1 * | 3/2018 | Chen | ..................... | G06F 9/5022 |

(Continued)

*Primary Examiner* — Hiren P Patel
(74) *Attorney, Agent, or Firm* — Han Santos, PLLC

(57) ABSTRACT

An edge computing device receives, from a user device via an isolated local area network, a request for computing services that are hosted on the edge computing device and not on the user device. The edge computing device accesses policies that are applicable to the user device and the requested computing services. Based on the policies and the requested computing services, the edge computing device instantiates a container configured to provide the requested computing services. The container receives offloaded processing tasks from the device. The container executes the offloaded processing tasks, and sends, to the user device, data indicative of the processed tasks.

19 Claims, 6 Drawing Sheets

(56) References Cited

U.S. PATENT DOCUMENTS

| | | | |
|---|---|---|---|
| 2018/0285156 A1* | 10/2018 | Corey | G06F 9/4843 |
| 2019/0050272 A1* | 2/2019 | Liu | G06F 9/45558 |
| 2019/0095186 A1* | 3/2019 | Jozsa | G06F 8/65 |
| 2019/0095254 A1* | 3/2019 | Rao | G06F 8/71 |
| 2019/0155633 A1* | 5/2019 | Faulhaber, Jr. | G06F 9/45558 |
| 2019/0243628 A1* | 8/2019 | Goldmann | G06F 8/63 |
| 2019/0294451 A1* | 9/2019 | Baig | G06F 9/5038 |
| 2020/0099656 A1* | 3/2020 | Mittal | H04L 61/256 |
| 2020/0136825 A1* | 4/2020 | Gupta | H04L 9/3213 |
| 2020/0136921 A1* | 4/2020 | Doshi | G06F 9/3836 |
| 2020/0145337 A1* | 5/2020 | Keating | G06F 9/5077 |
| 2020/0264939 A1* | 8/2020 | Liu | H04L 41/5025 |
| 2020/0341754 A1* | 10/2020 | Kunjuramanpillai | G06F 8/71 |
| 2021/0011762 A1* | 1/2021 | Lin | G06N 20/00 |
| 2021/0109778 A1* | 4/2021 | Keating | A63F 13/30 |
| 2021/0117220 A1* | 4/2021 | Zu | G06F 9/50 |
| 2021/0337014 A1* | 10/2021 | Cameron | G06F 9/546 |
| 2022/0075666 A1* | 3/2022 | Xia | G06F 9/45558 |

\* cited by examiner

LOCAL EDGE DEVICE

BACKGROUND

Edge computing is often focused on cloud-based implementations, creating and deploying services that depend on cloud-based computing resources for distributed applications. Cloud-based implementations may rely on cellular wireless connectivity or other network-based services. However, tomorrow's applications need lower latencies and improved response times than can be supported using cloud-based implementations. Furthermore, many local applications may not need the large-scale resources of cloud-based service providers. Additionally, some devices and applications may not have the capability to establish a connection with a cloud-based service.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

FIG. 1 an illustration of a system that may be used in various embodiments.

DETAILED DESCRIPTION

Figure 1:
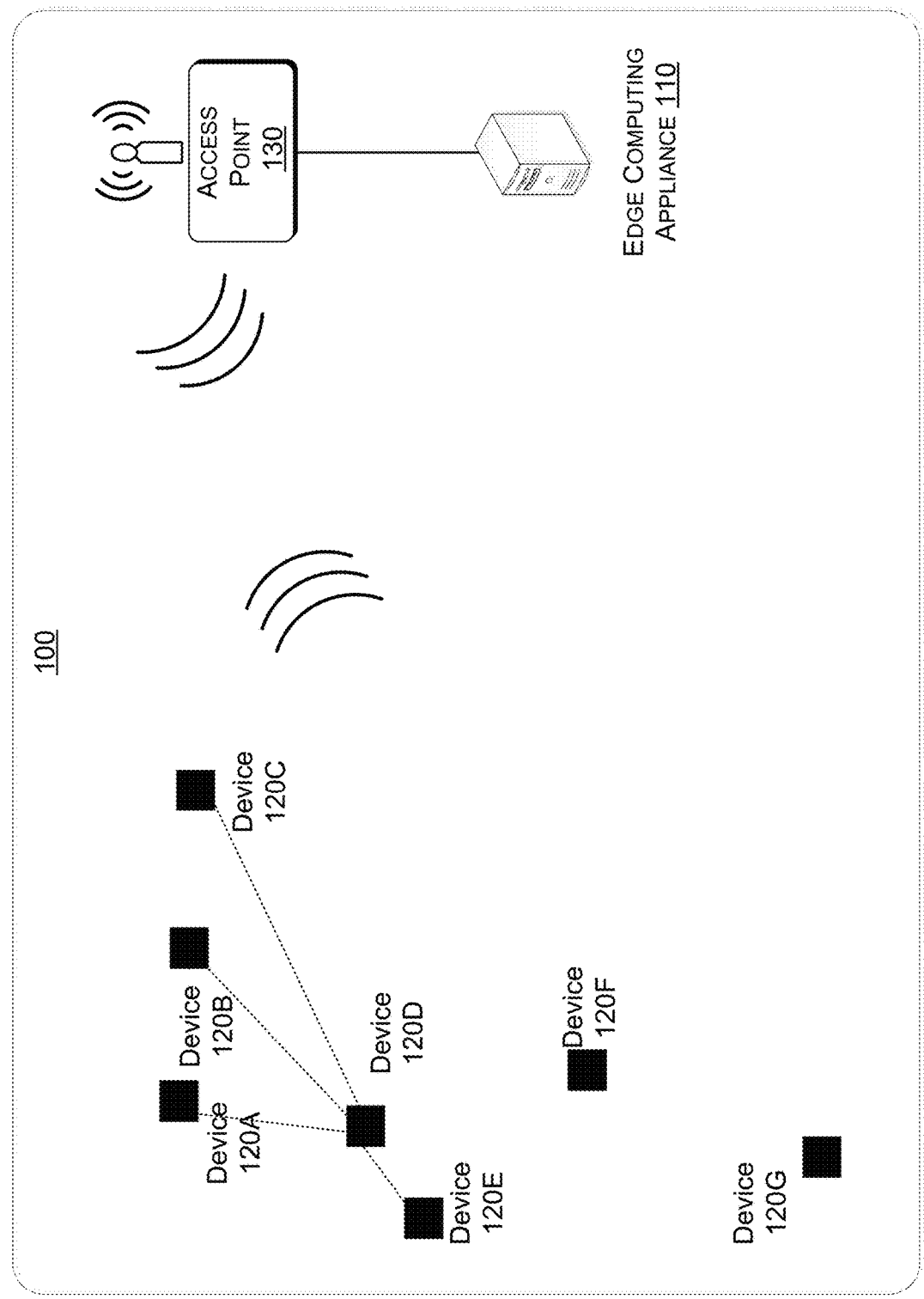

The present disclosure describes a way to provide an edge computing appliance that is configured to provide an on-premise computing resource pool that can connect to and provide computing and other resources to a variety of local devices. The services can be provided to, for example, Internet of Things (IoT) or other devices in a defined area, thus enabling accelerated computing services that are available at a closer proximity to the user devices.

In an embodiment, the edge computing appliance may provide graphics processing, video streaming, accelerated compute, storage, and other resources to the local devices on-demand and in real-time by instantiating virtual instances for each requesting local device. The local devices may use this off-device edge computing capability to access services that may not be possible using only on-device capabilities, such as location-based virtual reality (LBVR), SLAM, holograms, mobile gaming, and other services. The edge computing appliance may thus eliminate the need for devices to have the capacity to load and locally execute applications, and alleviate the need to run all the latest functionality within the device.

The edge computing appliance may provide compatibility with a wide range of connected devices (e.g., mobile phones, IoT devices such as wireless cameras, appliances, or voice assistants) and applications. Local devices may access the resources with little or no configuration, thus enabling a greater set of devices to access off-device services without the need to connect to and maintain communications sessions that are beyond the capabilities of simpler devices. Concurrent containers may be instantiated to provide the desired functionality to connected devices. Security may be improved because data remains in the locality of the edge computing appliance without the need to transmit data off-premises, such as to the cloud. The edge computing appliance thus enables a new class of accelerated compute service that is available at closer proximity to a user's locality, such as a home or factory.

In an embodiment, the edge computing appliance may be a server device that is located on a local network such as a Wi-Fi network and configured to provide applications and compute services. Such applications and compute services may include, for example, deep neural network (DNN) inferencing, GPU rendering (i.e., real-time ray tracing), virtual desktop capabilities, high-definition semantic image segmentation, object detection and localization, reinforcement learning based control systems and intelligent agents, natural language processing, online machine learning training, computer vision such as simultaneous localization and mapping (SLAM), high fidelity facial recognition, depth camera and light detection and ranging (LIDAR) point cloud processing, real-time 3D geometric reconstruction from video, complex inverse kinematics (IK) and forward kinematics (FK), 2D and 3D path planning and anomaly detection, high definition (HD 1080p) and ultra-high definition (UHD 4K) video broadcast of live video from one to many or many to many clients, augmented reality (AR) high definition (HD 1080p) and ultra-high definition (UHD 4K) 3D augmented video broadcast of live video from one to many or many to many clients, and other local network application services for devices that require compute capabilities beyond what they can accomplish with their own compute power.

In various embodiments, the edge computing appliance may include a platform of software and hardware (e.g., GPU, efficient CPU, fast SSD, SoC decoder/encoders, 10G ethernet and Wi-Fi 6, 802.1ay wireless connections managed by a software defined layer-3 VNF multicast enabled switch). The edge computing appliance may be configured to be compatible with a wide range of connected wireless devices (mobile phones, IoT devices such as wireless cameras, appliances or voice assistants) and applications. Devices may access the resources of the edge computing appliance with little or no configuration.

In some embodiments, one or more concurrent containers may provide functionality to connected devices. As used herein, a container may be an isolated user space instance. Such containers may also variously correspond to partitions, virtual environments, or virtual machines. All such implementations may be encompassed by containers as used herein. Containers may be instantiated to support connected devices and collapsed when no longer needed. A container's use of a particular underlying resource may be controlled via application profile certificates.

By implementing an edge computing appliance on-premises, compute resources can be made available to on-premises devices at low latency (e.g., 2-10 ms) rather than the higher latencies experienced when communicating with cloud-based resources. Additionally, connectivity may be kept secure between the edge computing appliance and the on-premises device because data is not being transmitted off-premises. Use of the edge computing appliance for compute resources enables the use of local devices with lighter processing and storage requirements, enabling less complex and less expensive devices, and improving device battery and performance. The use of an edge computing appliance can enable functionality not previously available to local devices as well as enable greater efficiencies, such as immersive multicasting which eliminates the redundant network load of immersive content (e.g. 360° 4K VR), providing better shared common experiences in a multi-user scenario.

In some embodiments, the edge computing appliance may enable automatic discovery and advertise itself and its services on the local network using protocols such as Avahi, ZeroConf, or Bonjour. For example, the edge computing appliance may advertise that it is providing a "Human Figure Semantic Segmentation" of a video streaming service, or advertise that it is providing a "viewer service," and providing a HTML5 video stream web interface for playback. The local devices may advertise for services such as a camera stream service for an IP camera, or a "view sink" for a "Smart TV."

In some embodiments, the edge computing appliance may be configured to register or unregister connected clients and manage the execution of services/applications. Clients may include a variety of devices such as mobile phones, tablets, low-cost laptops, IP cameras, IP-connected displays (televisions, smart mirrors, etc.), and robots and industrial systems (pick & place machines, autonomous forklift, visual sorting, welding, complex assembly, etc.).

In some embodiments, the edge computing appliance may be configured to perform predictive resource allocation. The edge computing appliance may use various input to predict that a user device will enter the network and allocate and instantiate a container for that user device before the user device actually enters the local network. The edge computing appliance may further configure the container based on the anticipated needs of the user device, such as storage and computing resources. When the user device leaves the network, the edge computing appliance may be configured to remove the container allocated to that user device, thus freeing up resources for other user devices.

In some embodiments, the container may be loaded onto the edge computing appliance from the user device. In some embodiments, the edge computing appliance may be configured to receive and execute containers that conform to a predetermined set of attributes. So long as the container conforms to these attributes, the edge computing appliance may be configured to execute the received container. When a container is received from a user device, the container package may further indicate the resources that are needed from the edge computing appliance.

Because the edge computing appliance can receive containers from the user devices, the edge computing appliance does not need to be connected to an external network. For example, the edge computing appliance does not need to access a third party resource via the Internet in order to access containers. The edge computing appliance may thus be operable in an unconnected area without Internet access and will still be usable to provide the resources as described herein.

The user device may also provide updates to the edge computing appliance. The user device may have its own access to an external network and thus provide any updates to the edge computing appliance. Alternatively, the user device may access and store updates when connected to an external network, and subsequently provide the updates to the edge computing appliance when connected to the edge computing appliance, even when the user device is no longer connected to the external network. In one example, a user device may download and execute an application configured to access and obtain updates for the edge computing appliance.

In some embodiments, the edge computing appliance may implement an application programming interface (API) to allow client applications to discover and communicate with the edge computing appliance and its applications.

In some embodiments, the edge computing appliance may be used to provide a local interface to cloud-based services. In some embodiments, the edge computing appliance may provide caching and other functionality to provide reduced latencies to cloud-originated data. For example, virtual assistants may connect to the edge computing appliance to access low latency compute services and content that is cached on the edge computing appliance. The edge computing appliance may pre-load remote rendering virtual containers, enabling extended reality (XR) devices to provide rendering on-premises. Developers may build applications such as mobile games that can access the edge computing appliance's compute capabilities. For example, games may leverage video streams from connected devices such as Wi-Fi cameras, cast augmented reality content onto connected TVs, and provide immersive experiences without privacy concerns for images being sent out to cloud servers through the public Internet.

In industrial settings, the edge computing appliance can be used to enhance the performance and capabilities of a typical production line without significant changes to existing factory infrastructure. In one example, a production line may wirelessly send video and sensor data to the edge computing appliance. The data may be processed and wirelessly streamed back to the production line where the processed data can be acted upon. For real-time tracking and monitoring, the edge computing appliance can wirelessly stream processed video and data to multiple devices, such as tablets, workstations, and AR headsets.

In an embodiment, the edge computing appliance may be configured to instantiate a container for each device that requests compute resources from the edge computing appliance. Each user device may be referred to as a client or tenant. In some embodiments, the edge computing appliance may apply tenant policies to data traffic going to and from the tenant. The edge computing appliance may implement standard interfaces to which the tenants can communicate. The edge computing appliance may be configured to provide compute services to multiple tenants. The described techniques can allow for multiple tenant devices to access compute resources such as processor cycles, memory, and network bandwidth in an efficient manner.

Turning to FIG. 1, an example of a local system 100 implementing an edge computing appliance 110 is illustrated. The edge computing appliance 110 may be configured to connect to various devices 120A-120G (which may be referred herein singularly as "device 120" or in the plural as "devices 120"), analyze received data, perform one or more actions associated with requests for computing services, and send results of the performed actions to the devices 120. Each of the devices 120 may typically be mobile devices or installed in various locations in or near a home or other location proximate to the edge computing appliance 110. Although FIG. 1 shows six devices 120 located in various positions, this number can be larger or smaller depending on the configuration of the local system 100.

The edge computing appliance 110 may interface with the devices 120 by way of the access point 130, which may be any wireless access point utilizing technologies such as Bluetooth or Wi-Fi. However, in an example, an intermediary device can also be used. The devices 120 may be a smartphone, a tablet, or another computing device that is capable of communicating with the edge computing appliance 110 via, for example, Bluetooth, or communicate with access point 130 to communicate with edge computing appliance 110.

Figure 2:
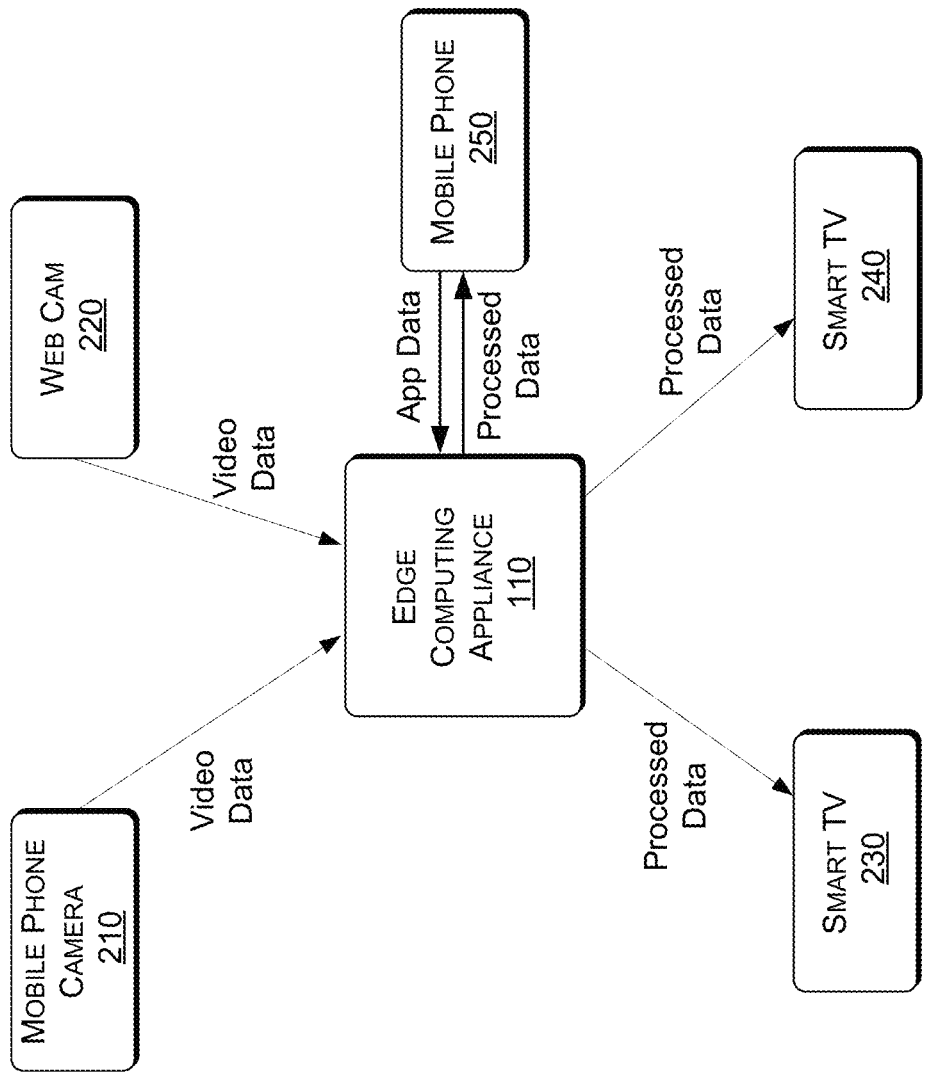
FIG. 2 is a diagram illustrating an edge computing appliance in accordance with the present disclosure.

FIG. 2 illustrates an example computing environment in which the embodiments described herein may be implemented. FIG. 2 illustrates an edge computing appliance 110 in communication with a mobile camera 210, web cam 220, smart TV 230, smart TV 240, and mobile phone 250. In the illustrated example, the edge computing appliance 110 may receive video data from mobile camera 210 and web cam 220. The edge computing appliance 110 may further receive application data from mobile phone 250. The edge computing appliance 110 may process the received application data and video data, as well as provide other computing services that are requested by mobile camera 210, web cam 220, smart TV 230, smart TV 240, and mobile phone 250. The edge computing appliance 110 may provide processed data to smart TV 230 and smart TV 240.

Figure 3:
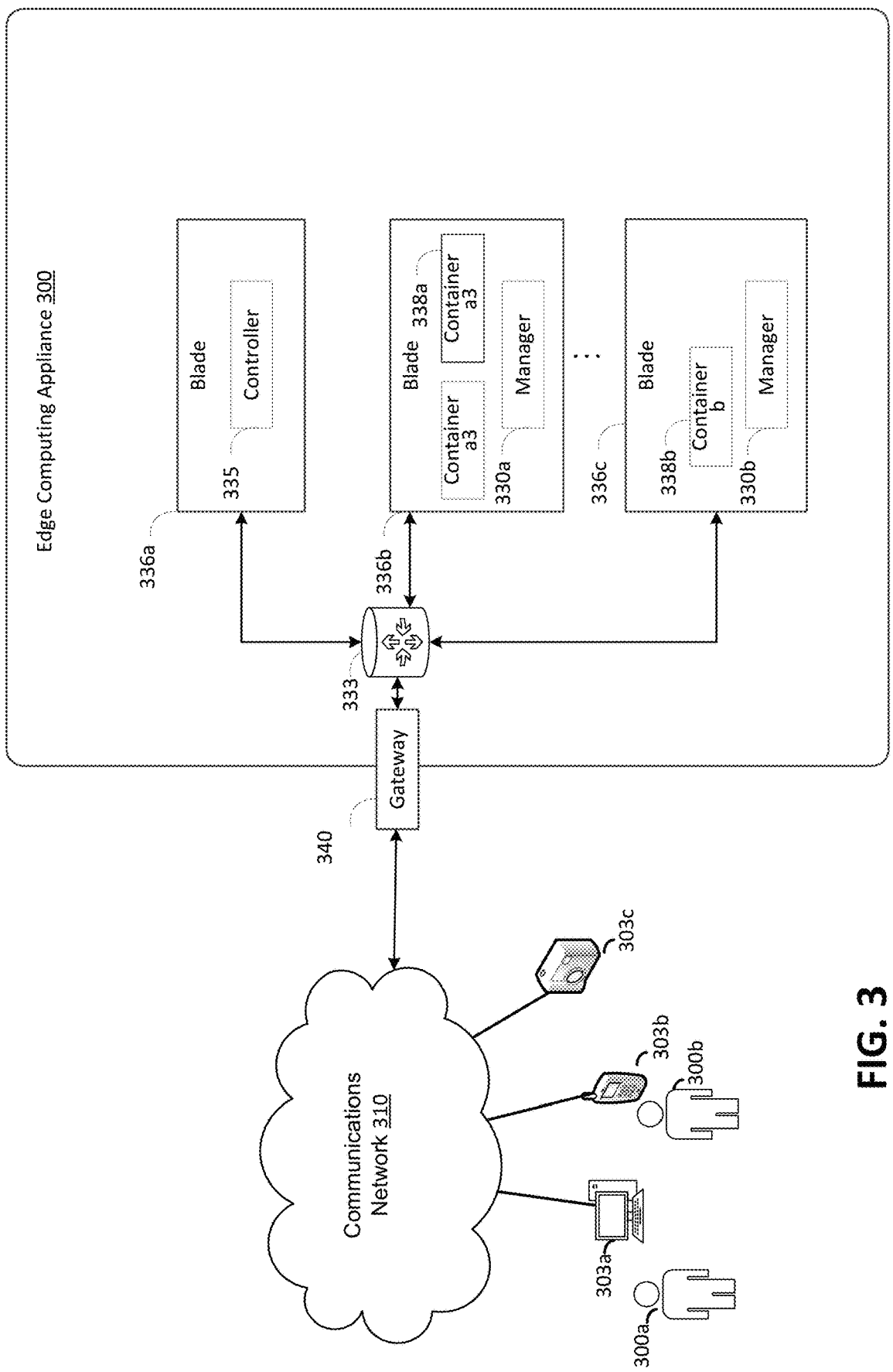
FIG. 3 is a diagram illustrating a computing environment with an edge computing appliance in accordance with the present disclosure.

FIG. 3 illustrates an example computing environment in which the embodiments described herein may be implemented. FIG. 3 illustrates a edge computing appliance 300 configured to provide computing resources to users 300a, or 300b (which may be referred herein singularly as "a user 300" or in the plural as "the users 300") via user devices 303a, 303b, and 303c (which may be referred herein singularly as "a device 303" or in the plural as "the devices 303") via a communications network 310. The computing resources provided by the edge computing appliance 300 may include various types of resources, such as computing resources, data storage resources, data communication resources, and the like. Each type of computing resource may be general-purpose or may be available in a number of specific configurations. For example, computing resources may be available as containers. The containers may be configured to execute applications and access allocated resources such as data storage resources (e.g., storage devices, block storage devices, and the like).

Edge computing appliance 300 may include one or more server blades 336a, 336b, and 336c (which may be referred to herein singularly as "a blade 336" or in the plural as "the blades 336") that provide computing resources available as containers 338a and 338b (which may be referred to herein singularly as "a container 338" or in the plural as "the containers 338"). The containers 338 may be configured to execute applications and access resources that may be allocated include data storage resources (not shown on FIG. 3) and may include file storage devices, block storage devices, and the like. Blades 336 may also execute functions that manage and control allocation of resources in the edge computing appliance 300, such as a controller 335. Controller 335 may be a type of program configured to manage the allocation of containers on blades 336. While FIG. 3 depicts an edge computing appliance with three blades, the edge computing appliance may have any number of blades.

Communications network 310 may, for example, a private network, such as a Wi-fi network that is wholly or partially inaccessible to the public. Communications network 310 may provide access to devices 303. Devices 303 may be devices utilized by users 300. Device 303a, 303b, or 303c may be a desktop or laptop personal computer, a tablet computer, a smartphone, a set-top box, or any other device capable of accessing edge computing appliance 300. Although only three devices 303a, 303b, and 303c are depicted, it should be appreciated that there may be greater numbers of devices.

Devices 303 may also be utilized to configure aspects of the computing resources provided by the edge computing appliance. For example, the edge computing appliance may provide a Web interface through which aspects of its operation may be configured through the use of a Web browser application program executing on device 303. Alternatively, a stand-alone application program executing on device 303 may be used to access an application programming interface (API) exposed by the edge computing appliance 300 for performing the configuration operations.

It should be appreciated that although the embodiments disclosed above are discussed in the context of an edge computing appliance configured to instantiate containers, other types of implementations can be utilized with the concepts and technologies disclosed herein. It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 3 has been greatly simplified and that many more networks and networking devices may be utilized to interconnect the various computing systems disclosed herein. These network topologies and devices should be apparent to those skilled in the art.

It should also be appreciated that edge computing appliance 300 described in FIG. 3 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

FIG. 3 illustrates an example computing environment illustrating integration of an edge computing appliance 300 in accordance with the present disclosure. In an embodiment, the edge computing appliance may provide a container for each tenant that connects to the edge computing appliance and requests resources.

Figure 4:
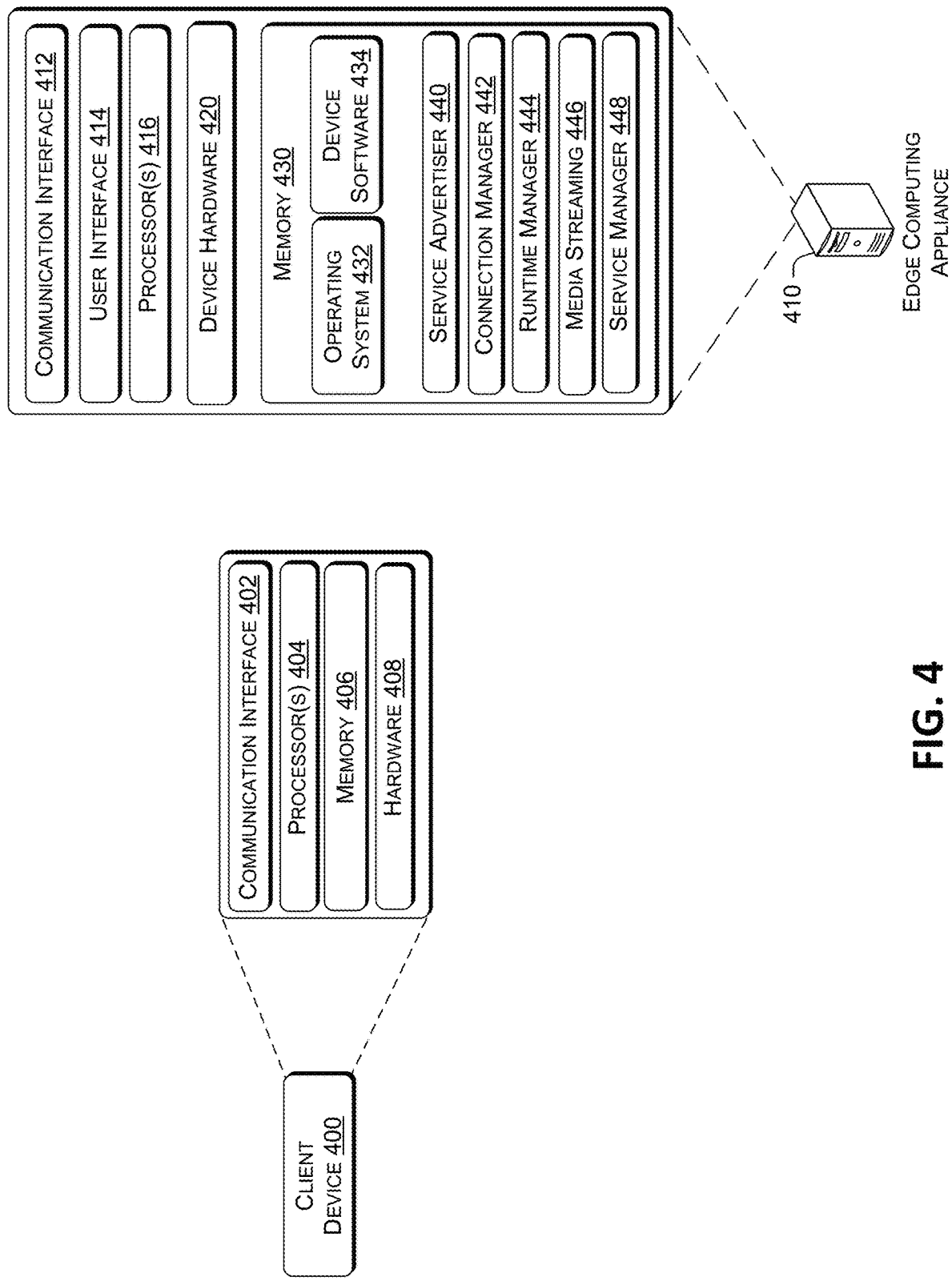
FIG. 4 is an example computing device in accordance with the present disclosure.

FIG. 4 is a block diagram showing various components of an edge computing appliance 410 and a client device 400 in accordance with some embodiments. The client device 400 may be representative of various devices that may communicate with edge computing appliance 410 and may include a communication interface 402, one or more processors 404, memory 406, and hardware 408. The communication interface 402 may include wireless and/or wired communication components that enable the client device 400 to transmit data to and receive data from other networked devices. The hardware 408 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 406 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

As shown in FIG. 4, edge computing appliance 410 may include a communication interface 412, a user interface 414, one or more processors 416, memory 430, and device hardware 420. The communication interface 412 may include wireless and/or wired communication components that enable the edge computing appliance 410 to transmit or receive data communication via a local network, as well as other telecommunication and/or data communication networks.

The user interface 414 may enable a user to provide inputs and receive outputs from the client device 400. The user interface 414 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 430 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. In some embodiments, the edge computing appliance 410 or components thereof may communicate with computing resources that are hosted in a computing cloud. The computing cloud may include a variety of disaggregated servers that provide virtual application server functionalities and virtual storage functionalities.

The device hardware 420 may include a network interface that enables the edge computing appliance 410 to perform telecommunication and data communication with a network. The device hardware 420 may further include signal converters, antennas, hardware decoders and encoders, graphics processors, a universal integrated circuit card (UICC) or an embedded UICC (eUICC), and/or the like that enable the edge computing appliance 410 to execute applications and provide telecommunication and data communication functions.

The one or more processors 416 and the memory 418 of the client device 400 may implement an operating system 432, device software 434, service advertiser 440, connection manager 442, runtime manager 444, media streaming function 446, and service manager 448. Such software may include routines, program instructions, objects, and/or data structures that are executed by the processors 416 to perform particular tasks or implement particular abstract data types. The one or more processors 416 may include a graphics processing unit (GPU) or other types of processing units.

The operating system 432 may include components that enable the edge computing appliance 410 to receive and transmit data via various interfaces (e.g., user controls, communication interface 412, and/or memory input/output devices). The operating system 432 may also process data using the one or more processors 416 to generate outputs based on inputs that are received via the user interface 414. For example, the operating system 432 may provide an execution environment for the execution of the service advertiser 440, connection manager 442, runtime manager 444, media streaming function 446, and service manager 448. The operating system 432 may include a presentation component that presents the output (e.g., display the data on an electronic display, store the data in memory, transmit the data to another electronic device, etc.).

The operating system 432 may include an interface layer that enables applications to interface with the modem and/or the communication interface 412. The interface layer may comprise public APIs, private APIs, or a combination of both public APIs and private APIs. Additionally, the operating system 432 may include other components that perform various other functions generally associated with an operating system. The device software 444 may include software components that enable the user device to perform functions. For example, the device software 434 may include basic input/output system (BIOS), bootrom, or a bootloader that boots up the client device 400 and executes the operating system 432 following power-up of the device.

Additional applications may be provided by edge computing appliance 410, such as applications that provide utility and/or productivity functionalities of the edge computing appliance 410.

Figure 5:
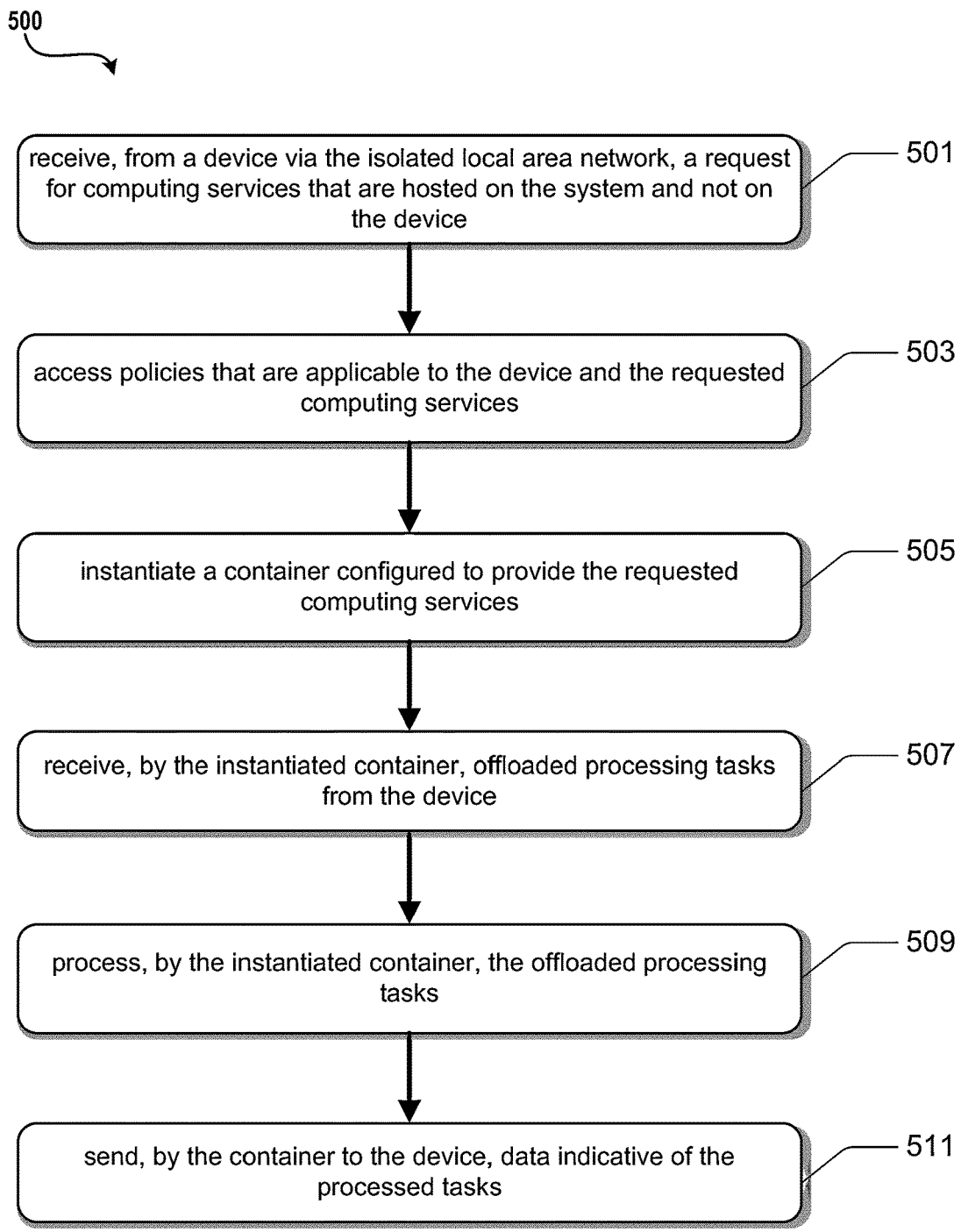
FIG. 5 is a flowchart depicting an example procedure for implementing an edge computing appliance in accordance with the present disclosure.

Turning now to FIG. 5, illustrated is an example operational procedure for implementing an edge computing appliance in accordance with the present disclosure. Referring to FIG. 5, operation 501 illustrates receiving, from a device via the isolated local area network, a request for computing services that are hosted on the system and not on the device.

Operation 501 may be followed by operation 503. Operation 503 illustrates accessing policies that are applicable to the device and the requested computing services.

Operation 503 may be followed by operation 505. Operation 505 illustrates based on the policies and the requested computing services, instantiating a container configured to provide the requested computing services. Operation 505 may be followed by operation 507. Operation 507 illustrates receiving, by the instantiated container, offloaded processing tasks from the device. Operation 507 may be followed by operation 509. Operation 509 illustrates processing, by the instantiated container, the offloaded processing tasks. Operation 509 may be followed by operation 511. Operation 511 illustrates processing, by the instantiated container, the offloaded processing tasks.

In an embodiment, the computing services comprise graphics processing services, wherein the graphics processing services are provided by a graphics processing unit (GPU).

In an embodiment, the system further comprises instructions that, when executed by the one or more processors, cause the system to perform operations comprising: receiving requests from additional devices for computing services; accessing policies that are applicable to the additional devices and the requested computing services; and based on the policies and the requests, instantiating additional containers configured to provide the requested computing services.

In an embodiment, the system further comprises instructions that, when executed by the one or more processors, cause the system to perform operations comprising: multicasting content to a plurality of devices via the isolated local area network.

In an embodiment, the computing services comprise deep neural network (DNN) inferencing.

In an embodiment, the system further comprises instructions that, when executed by the one or more processors, cause the system to perform operations comprising: enabling automatic discovery; and broadcasting the system and available services on the isolated local area network.

In an embodiment, the system further comprises instructions that, when executed by the one or more processors, cause the system to perform operations comprising: implementing an application programming interface (API) configured to allow client applications to discover and communicate with the system and its applications In an embodiment, the system further comprises instructions that, when executed by the one or more processors, cause the system to perform operations comprising: implement an interface to one or more cloud-based services; and cache content received from the cloud-based services.

Figure 6:
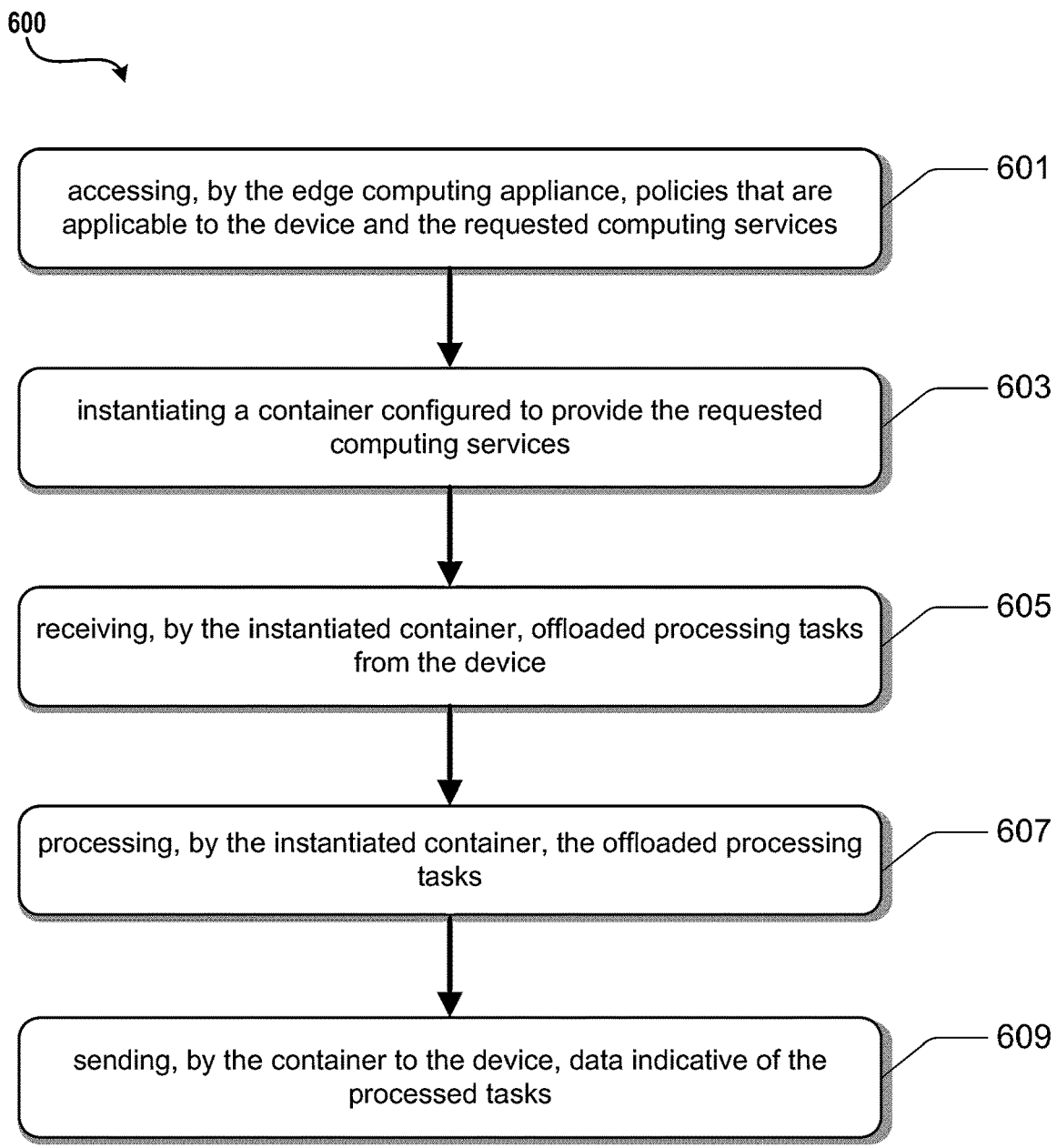
FIG. 6 is a flowchart depicting an example procedure for implementing an edge computing appliance in accordance with the present disclosure.

Referring to FIG. 6, illustrated is another example operational procedure for implementing an edge computing appliance. Referring to FIG. 6, operation 601 illustrates receiving, by an edge computing appliance via the private local network, a request for computing services, the request received from a device communicating on the private local network.

Operation 601 may be followed by operation 603. Operation 603 illustrates accessing, by the edge computing appliance, policies that are applicable to the device and the requested computing services.

Operation 603 may be followed by operation 606. Operation 605 illustrates based on the policies and the request, instantiating a container configured to provide the requested computing services.

Operation 605 may be followed by operation 607. Operation 607 illustrates receiving, by the instantiated container, offloaded processing tasks from the device.

Operation 607 may be followed by operation 609. Operation 609 illustrates processing, by the instantiated container, the offloaded processing tasks.

Operation 609 may be followed by operation 611. Operation 611 illustrates sending, by the container to the device, data indicative of the processed tasks.

In an embodiment, the edge computing appliance is configured to instantiate a container or network container for each device that requests computing services from the edge computing appliance. In some embodiments, the edge computing appliance may be configured to load containers onto a UE and remove containers from a UE.

In an embodiment, the edge computing appliance is configured to implement a standard interface to the device. In an embodiment, the computing services comprise deep neural network (DNN) inferencing. In an embodiment, the edge computing appliance is configured to register or unregister connected device and manage execution of services and applications.

In an embodiment, a subnet of a virtual network is designated for the device.

In some embodiments, a UE that has connectivity beyond the local network may provide updates to the edge computing appliance.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, a computing system, an article of manufacture, such as a computer-readable storage medium, or a component including hardware logic for implementing functions, such as a field-programmable gate array (FPGA) device, a massively parallel processor array (MPPA) device, a graphics processing unit (GPU), an application-specific integrated circuit (ASIC), a multiprocessor System-on-Chip (MPSoC), etc. A component may also encompass other ways of leveraging a device to perform a function, such as, for example, a) a case in which at least some tasks are implemented in hard ASIC logic or the like; b) a case in which at least some tasks are implemented in soft (configurable) FPGA logic or the like; c) a case in which at least some tasks run as software on FPGA software processor overlays or the like; d) a case in which at least some tasks run as software on hard ASIC processors or the like, etc., or any combination thereof. A component may represent a homogeneous collection of hardware acceleration devices, such as, for example, FPGA devices. On the other hand, a component may represent a heterogeneous collection of different types of hardware acceleration devices including different types of FPGA devices having different respective processing capabilities and architectures, a mixture of FPGA devices and other types hardware acceleration devices, etc.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A system comprising:
   one or more interfaces configured to communicate to one or more devices via an isolated local area network;
   one or more processors; and
   memory storing instructions that, when executed by the one or more processors, cause the system to perform operations comprising:
   receive, via the isolated local area network and from a device that is configured to communicate with an additional network in addition to the isolated local area network, a container package that includes a first container, a second container, and computing attributes required to execute the first container;
   determine, by the system, that the system conforms to the computing attributes required to execute the first container included in the container package;
   receive, from the device via the isolated local area network, a first request for computing services that are hosted on the system and not on the device and a second request for the second container;
   access policies that are applicable to the device and the requested computing services;
   based on the policies, the requested computing services, and determining that the system conforms to the computing attributes required to execute the first container, execute the first container included in the container package;
   in response to the second request for the second container, provide, for output by the system and to the device via the isolated area network, the second container included in the container package;
   without communicating with the additional network, receive, via the isolated local area network and from the device, an update to the first container, wherein the device received the update to the first container while connected to the additional network;
   generate, by the system, an updated first container by applying the update to the first container included in the container package;
   receive, by the updated first container, offloaded processing tasks from the device;
   process, by the updated first container, the offloaded processing tasks;
   send, by the updated first container and to the device, data indicative of the processed tasks; and
   remove, by the system, the second container from the device.

2. The system of claim 1, wherein the computing services comprise graphics processing services, wherein the graphics processing services are provided by a graphics processing unit (GPU).

3. The system of claim 1, further comprising instructions that, when executed by the one or more processors, cause the system to perform operations comprising:
   receive requests from additional devices for computing services;
   access policies that are applicable to the additional devices and the requested computing services; and
   based on the policies and the requests, execute additional containers configured to provide the requested computing services.

4. The system of claim 1, further comprising instructions that, when executed by the one or more processors, cause the system to perform operations comprising:
   multicast content to a plurality of devices via the isolated local area network.

5. The system of claim 1, wherein the computing services comprise deep neural network (DNN) inferencing.

6. The system of claim 1, further comprising instructions that, when executed by the one or more processors, cause the system to perform operations comprising:
   enabling automatic discovery; and
   broadcasting the system and available services on the isolated local area network.

7. The system of claim 1, further comprising instructions that, when executed by the one or more processors, cause the system to perform operations comprising:

implement an application programming interface (API) configured to allow client applications to discover and communicate with the system and its applications.

8. The system of claim 1, further comprising instructions that, when executed by the one or more processors, cause the system to perform operations comprising:
    implement an interface to one or more cloud-based services; and
    cache content received from the cloud-based services.

9. A method for implementing a private local network, the method comprising:
    receiving, via the private local network, by an edge computing appliance, and from a device that is configured to communicate with an additional network in addition to the private local network, a container package that includes a first container, a second container, and computing attributes required to execute the first container;
    determining, by the edge computing appliance, that the edge computing appliance conforms to the computing attributes required to execute the first container included in the container package;
    receiving, by the computing appliance and from the device via the private local network, a first request for computing services and a second request for the second container;
    accessing, by the edge computing appliance, policies that are applicable to the device and the requested computing services;
    based on the policies, the requested computing services, and determining that the edge computing appliance conforms to the computing attributes required to execute the first container, executing the first container included in the container package;
    in response to the second request for the second container, providing, for output by the edge computing appliance and to the device via the isolated area network, the second container included in the container package;
    without communicating with the additional network, receiving, via the private local network and from the device, an update to the first container, wherein the device received the update to the first container while connected to the additional network;
    generating, by the edge computing appliance, an updated first container by applying the update to the first container included in the container package;
    receiving, by the updated first container, offloaded processing tasks from the device;
    processing, by the updated first container, the offloaded processing tasks;
    sending, by the updated first container and to the device, data indicative of the processed tasks; and
    removing, by the edge computing appliance, the second container from the device.

10. The method of claim 9, wherein the edge computing appliance is configured to execute a given container or network container for each device that requests computing services from the edge computing appliance.

11. The method of claim 9, wherein the edge computing appliance is configured to implement a standard interface to the device.

12. The method of claim 9, wherein the edge computing appliance is configured to register or unregister a connected device and manage execution of services and applications.

13. The method of claim 9, wherein a subnet of a virtual network is designated for the device.

14. A non-transitory computer-readable storage medium storing thereon computer-readable instructions which, when executed by one or more processors of a computing system, cause the computing system to perform operations comprising:
    receive, via an isolated local area network and from a device that is configured to communicate with an additional network in addition to the isolated local area network, a container package that includes a first container, a second container, and computing attributes required to execute the first container;
    determine, by the computing system, that the computing system conforms to the computing attributes required to execute the first container included in the container package;
    receive, from the device, a request for computing services that are hosted on the computing system and not on the device and a second request for the second container;
    access policies that are applicable to the device and the requested computing services;
    based on the policies, the requested computing services, and determining that the computing system conforms to the computing attributes required to execute the first container, execute the first container included in the container package;
    in response to the second request for second container, provide, for output by the computing system and to the device via the isolated local area network, the second container included in the container package;
    without communicating with the additional network, receive, via the isolated local area network and from the device, an update to the first container, wherein the device received the update to the first container while connected to the additional network;
    generate, by the computing system, an updated first container by applying the update to the first container included in the container package;
    receive, by the updated first container, offloaded processing tasks from the device;
    process, by the updated first container, the offloaded processing tasks;
    send, by the updated first container and to the device, data indicative of the processed tasks; and
    remove, by the computing system, the second container from the device.

15. The non-transitory computer-readable storage medium of claim 14, further comprising instructions that, when executed by the one or more processors, cause the device to perform operations comprising:
    receive requests from additional devices for computing services;
    access policies that are applicable to the additional devices and the requested computing services; and
    based on the policies and the requests, execute additional containers configured to provide the requested computing services.

16. The non-transitory computer-readable storage medium of claim 14, further comprising instructions that, when executed by the one or more processors, cause the system to perform operations comprising:
    multicast content to a plurality of devices via the isolated local area network.

17. The non-transitory computer-readable storage medium of claim 14, further comprising instructions that, when executed by the one or more processors, cause the system to perform operations comprising:
    enabling automatic discovery; and broadcasting the system and available services on the isolated local area network.

18. The non-transitory computer-readable storage medium of claim 14, further comprising instructions that, when executed by the one or more processors, cause the system to perform operations comprising:
implement an application programming interface (API) configured to allow client applications to discover and communicate with the system and its applications.

19. The non-transitory computer-readable storage medium of claim 18, wherein the computing services comprise one or more of deep neural network (DNN) inferencing, GPU rendering, high-definition semantic image segmentation, object detection and localization, reinforcement learning-based control systems and intelligent agents, natural language processing, online machine learning training, computer vision, high fidelity facial recognition, depth camera and light detection and ranging (LIDAR) point cloud processing, real-time 3D geometric reconstruction from video, complex inverse kinematics (IK) and forward kinematics (FK), 2D and 3D path planning and anomaly detection, high definition and ultra-high definition video broadcast of live video from one to many or many to many clients, or augmented reality (AR) high definition and ultra-high definition 3D augmented video broadcast of live video from one to many or many to many clients.

* * * * *